(12) United States Patent
Uzrad-Nali et al.

(10) Patent No.: US 6,760,304 B2
(45) Date of Patent: Jul. 6, 2004

(54) APPARATUS AND METHOD FOR RECEIVE TRANSPORT PROTOCOL TERMINATION

(75) Inventors: Oran Uzrad-Nali, Sunnyvale, CA (US); Dror Har-Chen, Sunnyvale, CA (US)

(73) Assignee: Silverback Systems, Inc., Campbell, CA (US)

( * ) Notice: Subject to any disclaimer, the term of this patent is extended or adjusted under 35 U.S.C. 154(b) by 99 days.

(21) Appl. No.: 10/281,213

(22) Filed: Oct. 28, 2002

(65) Prior Publication Data

US 2004/0083288 A1 Apr. 29, 2004

(51) Int. Cl.[7] .................................................. H04J 1/16
(52) U.S. Cl. ........................................ 370/229; 370/389
(58) Field of Search ................................ 370/389, 465, 370/466, 469, 471, 474, 475, 476, 351, 352, 229, 230, 231, 235, 236, 252, 254, 411–419, 428; 705/42, 33; 707/104.1, 200, 226; 715/530; 711/161; 709/230, 238, 250

(56) References Cited

U.S. PATENT DOCUMENTS

| | | | |
|---|---|---|---|
| 5,170,466 A | * | 12/1992 | Rogan et al. ............... 715/530 |
| 5,321,816 A | * | 6/1994 | Rogan et al. ................. 705/42 |
| 5,793,747 A | | 8/1998 | Kline |
| 6,163,773 A | | 12/2000 | Kishi |
| 6,219,701 B1 | | 4/2001 | Hirata et al. |
| 6,434,620 B1 | * | 8/2002 | Boucher et al. ............ 709/230 |

* cited by examiner

*Primary Examiner*—Dang Ton
(74) *Attorney, Agent, or Firm*—Sughrue Mion, PLLC (57) ABSTRACT

An apparatus and method are provided for termination of received network events (i.e., a packet received from the network) in a multiprocessing environment. Each processing node may handle one or more receive object queues, which may be linked in a linked list fashion, as well as a linked list of application stream queues to enable efficient termination of the received network events. Queues may be added, made inactive, or removed, depending on the status of a specific receive event the queue handles. By maintaining queues in memory the apparatus is easily scalable, linearly with the size of the memory made available.

65 Claims, 10 Drawing Sheets

APPARATUS AND METHOD FOR RECEIVE TRANSPORT PROTOCOL TERMINATION

This application cross-references related U.S. application Ser. No. 10/219,673, filed on Aug. 16, 2002. The contents of that application is incorporated herein by reference.

BACKGROUND OF THE INVENTION

1. Field of the Invention

The present invention generally relates to the management of received network events handled by a plurality of processing nodes. More specifically, the invention relates to a highly scalable apparatus for management of a receive transport protocol termination through the use of queues and pointers to memory locations.

2. Discussion of the Related Art

In the related art, operation in multiprocessing environments is known for handling various tasks requiring significant amounts of computing power, and which is best achieved by plurality of processors operating in parallel. Over time, it has become increasingly easy in the related art to integrate more than one processing node on a single chip, and thus create a powerful parallel processing unit. While the related art integration is highly effective in general processing applications, in other areas it would be advantageous to employ multiprocessing capabilities.

For example, in the related art area of network processing, many generally independent events occur in parallel and over short periods of time. For example, a file transfer protocol (FTP) session initiated by one user may be handled in parallel with another FTP session initiated by the same or another user, as well as other types of protocols that may be handled in parallel. Each FTP session generates its own events which, while adhering to the FTP requirements, are independent of each other. To achieve higher system throughput, it may be advantageous to handle these FTP sessions in parallel.

In the related art of the seven-layer communication model, data transferred over the network moves through the different layers to reach its final stage. The first layer is the physical layer that provides mechanical, electrical, functional and procedural means to activate, maintain and de-activate physical connections for bit transmission between data-link-entities, while the second layer is the data link layer that handles the transmission of frames (blocks) in a substantially error-free manner. Also, the third layer is the network layer that determines how messages are routed within the network, and allows transport entities to be independent from routing and relay considerations, including sub-network nodes.

The fourth layer is the transport layer that hides details of any network-dependent information from the higher layers by providing transparent data transfer. The transport layer is concerned with node to node transfer of data, rather than process to process. At the receiver portion, the data is reassembled in the correct sequence. Commonly, the activities associated with the handling of the third and fourth layer are performed by software.

The fifth layer is the session layer, as described in the related art standard communication model, and is responsible for establishing and releasing session connection. The sixth and seventh layers are the presentation and application layers, respectively, and are responsible for transforming application data into the common network format, and for communicating application process parameters.

In the related art, traffic is transported over the network using the transmission control protocol (TCP) or user datagram protocol (UDP). TCP is a connection-oriented transport media that sends data as unstructured streams of bytes. By using a sequence number and acknowledgment messages, TCP provides the source node with status on the bytes transmitted to the destination node. TCP is used when a reliable transport medium is required.

When data is lost, TCP can resend lost data, thereby ensuring reliable connectivity. TCP sends data as a sequence of "segments". A segment is a collection of data bytes sent as a single message. Each segment is sent through the network individually, with certain header information affixed to the segment. As a whole, the sequence of segments is referred to as a datagram.

When datagrams are received from a source at a destination, the original information is reconstructed. The reconstruction may take various forms in the related art to support the specific application that began the process on the transmitting side. For example, if a file transfer protocol (FTP) takes place, then an application capable of reconstructing the original data from the datagrams received is used. In addition to its payload, each datagram contains additional information including the source address, the destination address, the source port and destination port numbers, checksum information, segment length and a byte sequence number.

The checksum field contains a digest of the header and the payload, and is used to confirm correct reception of data. The segment length field in the header specifies the number of payload bytes contained in the segment, and the sequence number indicates the position of the last byte of the segment in the continuous byte stream.

If the data has been received correctly, then an acknowledgement signal is sent to the source to confirm successful receipt of the datagram. However, if such an acknowledgement is not received at the source from the destination, or an error notification is received, the datagram is retransmitted from the destination to the source. Once all of the data segments have been received and reconstructed to the original data, the transmitted data segments may be used by the destination.

With the advent of related art high speed network systems, transmitting at speeds of over one gigabit per second (1 Gbps and 10 Gbps systems are currently in various stages of deployment), it is becoming increasingly advantageous to move traditionally software based activities of TCP to high performance hardware implementations. Scaling software based solutions for higher performance is normally considered a significant challenge in the related art. For example, but not by way of limitation, the number of bits per second to be transferred is correlated with the number of instructions per second to be processed. Therefore, it would be necessary at the TCP level to have processors capable of providing performance of 10 giga instructions per second for a 10 Gbps network, which would result in a high cost system.

Accordingly, it would be advantageous to provide a hardware solution for processing TCP level activities, and for such a solution to be easily scalable. For example, a plurality of processing nodes operating in parallel can be provided. The solution must be consistent with the standard communication model as developed by the International Standards Organization (ISO) and known as the Open Systems Interconnection (OSI) networking suite. It consists of seven layers: physical (L1), logical or data link (L2), network (L3), transport (L4), session (L5), presentation (L6), and application (L7). Each layer handles a different facet of the communication providing clear definitions on how data received from the network is to be handled on its way to the application layer (L7), and vice versa, how data from the application layer is to be transferred onto the network by the physical layer (L1). A significant amount of processing takes place in each of these stages to ensure proper operation and interoperability between software and hardware components of the system and those of different vendors. Data moving between the layers is generally accompanies by a layer header containing information about the data attached to the data construct, e.g., a data packet of a data block.

However, the challenges that require addressing in a multiprocessing environment for transmit transport termination in a computer network are different from those in general application multiprocessing. For example, but not by way of limitation, traffic flowing over the network must be handled efficiently without impacting overall system performance. It would also be advantageous to provide easily scalable solutions, hence overcoming the significant costs and complexities associated with the aforementioned prior art solutions.

However, the related art does not provide any scalable, practical solution thereto. As a result, there is an unmet need in the related art for the aforementioned hardware solution for addressing in a multiprocessing environment for transmit transport termination in a computer network.

SUMMARY OF THE INVENTION

It is an object of the invention to overcome at least the various problems and disadvantages of the related art.

It is another object of the present invention to provide a hardware solution for addressing in a multiprocessing environment for efficient transmit transport termination in a computer network.

To achieve at least the above as well as other objects, an apparatus for handling receive transport protocol termination of network events of a source to destination connection is provided. The apparatus comprises a processing node and a queue manager and scheduler (QMS) coupled between the processing node and a first memory that includes at least one queue that is controlled by the processing node. The apparatus also includes a data manager coupled between the, processing node and a second memory that is configured to store data packets of the network events, and a receive handler capable of receiving packets from a network, wherein the QMS, the data manager and the receive handler are capable of commonly communicating with one another.

Additionally, a queue manager and scheduler (QMS) for handling receive transport protocol termination of network events of a source to destination connection is provided. The QMS includes an interface to a receive handler capable of providing a next available memory object descriptor (MOD) with pointer information of a packet located in a second memory. The QMS is capable of receiving a command from a receive handler and initiating packet handling by an object queue located in a first memory. Once the packet is identified, including processing of layer 3 and layer 4 headers, the packet is assigned to an appropriate application stream queue (ASQ) designated to process packets belonging to a specific connection. The MOD is re-linked from the object queue to the tail of the appropriate ASQ.

Further, a method for handling a receive transport protocol termination of network events respective of a source to destination connection is provided, comprising a) allocating queues for correspondingly handling the network events, and b) receiving a data packet and positioning a pointer from a first queue in a first memory to the received data packet. The method also includes the steps of c) identifying the received data packet, and transferring handling of the identified data packet to a second queue in the first memory, and d) pre-fetching control information for the data packet to a processing node allocated to handle the second queue, wherein the handling of the identified packet is controlled by the processing node, and the data packet is received in a second memory.

BRIEF DESCRIPTION OF THE DRAWINGS

The accompanying drawings, which are included to provide a further understanding of preferred embodiments of the present invention and are incorporated in and constitute a part of this specification, illustrate embodiments of the invention and together with the description serve to explain the principles of the drawings.

DETAILED DESCRIPTION OF THE INVENTION

Reference will now be made in detail to the preferred embodiment of the present invention, examples of which are illustrated in the accompanying drawings. In the present invention, the terms are meant to have the definition provided in the specification, and are otherwise not limited by the specification. Further, advantages of these and the stated objects reside in the details of construction and operation as more fully hereinafter described and claimed, reference being made to the accompanying drawings forming a part hereof, wherein like numerals refer to like parts throughout.

For purpose of clarity, the following definitions are provided. "Network event" refers to an event where information is passed over a network either upstream or downstream, and "queue event" refers to an event where a work item descriptor (WID), defined in more detail below, is sent from a queue to a processing node. The aforementioned network event may include a request from host, a protocol time-out and/or a new packet arrival from the network. However, the network event is not limited thereto, and may include other events as would be understood by one skilled in the art. Further, "network connection" refers to a connection between a source and a destination that is opened over a network.

Figure 1:
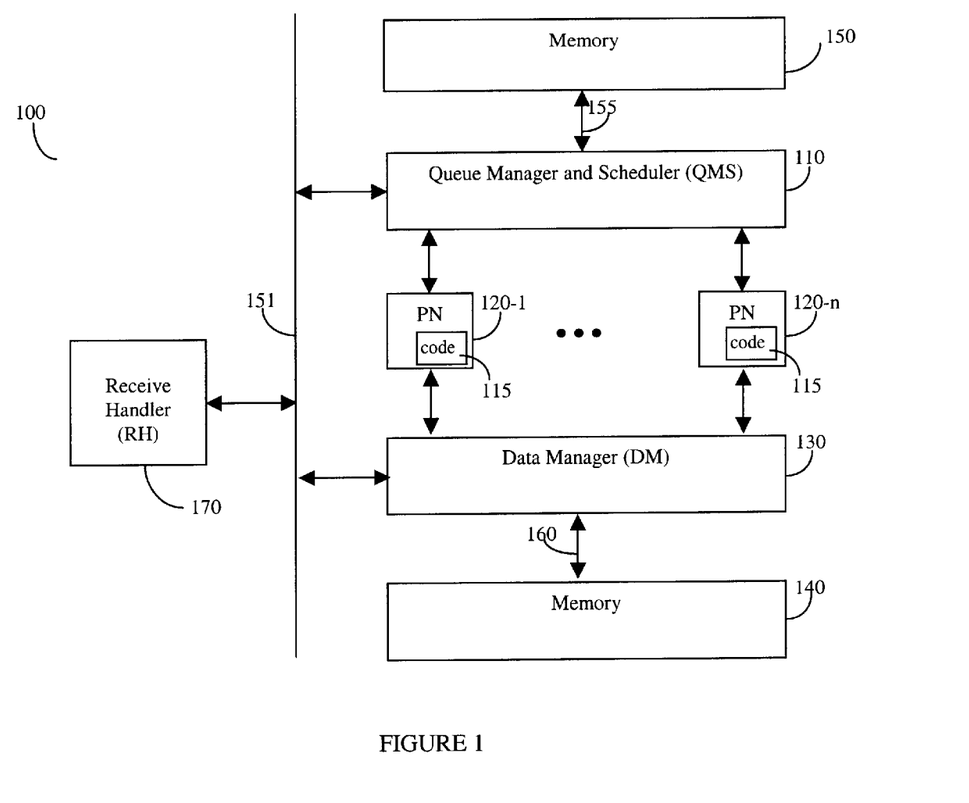
FIG. 1 illustrates a schematic block diagram of an apparatus according to an exemplary, non-limiting embodiment of the present invention.

FIG. 1 illustrates a non-limiting, exemplary block diagram embodying some of the teachings of the present invention. An apparatus 100 designed for scheduling network events in a multiprocessing environment includes a queue manager and scheduler (QMS) 110 coupled to one or more processing nodes (PN) 120-1 . . . 120-n, a data manager (DM) 130 coupled between the PN's 120-1 . . . 120-n and a first memory 140 via a communication link 160. A second memory 150 is coupled to QMS 110 via a communication link 155. A receive handler (RH) 170 is also provided that is capable of communicating with QMS 110 and DM 130 via an internal communication link 151.

Typically, the first memory 140 is implemented using dynamic random access memory (DRAM), and the second memory 150 is implemented using static random access memory (SRAM). However, the present invention is not limited thereto. Network event information is received by the RH 170 from the network. RH 170 is responsible for initiating an 'add object' command to QMS 110 in response to a network event, as described in more detail below. Data is transferred through DM 130 to and from the first memory 140, as each PN (e.g., 120-1) has direct memory access (DMA) engines.

The DMA engines enable a PN (e.g., 120-1) to pre-fetch data relevant to its activity prior to commencing any work respective of a queue it is scheduled to handle. The first memory 140 is used for, but is not limited to, storing packets received from the network as network events, storing information respective of host events, and data products that are the result of a PN (e.g., 120-1) performing certain processing respective of at least a queue event. The second memory 150 is used for the implementation of a plurality of queues, each of which is associated with a single PN (e.g., 120-1). However, the PN (e.g., 120-1) is not limited to the foregoing relationship, and may handle multiple queues. Each queue may further include pointers, such as pointers to the first and last memory object descriptor (MOD) associated with the queue, and also includes offset fields, as described below. The space for the MOD is allocated in the second memory 150 in this exemplary embodiment.

The PNs 120-1 . . . 120-n can include, but are not limited to, a local memory, a code memory, a direct memory access controller (DMAC) or a processor core, or any combination thereof. If the code memory is used, the code can be downloadable to software and/or hardware. Further, the code memory includes a code for processing the network events.

Also, if the DMAC is used as part of the processing node, the DMAC receives data from, and transmits data to, the second memory 140, the local memory, and/or the host memory, and the receiving and/or transmitting of data may be performed in parallel with the performing of another task at a given processing node (e.g., 120-1).

Queues may be opened, closed, or made inactive, as required for the processing of network events, and as further explained below. Each of the PNs 120-1 . . . 120-n has its own local memory for local processing in addition to respective code memories 115-1 . . . 115-n, which can be loaded with code to perform one or more tasks relative to processing required by a network event or queue handling.

Apparatus 100 is capable of creating at least two types of queues. The first type of queue is the object queue, which initially handles the network events as they are first captured by apparatus 100. The second type of queue is the application stream queue (ASQ), which is made available per a network connection.

Figure 2:
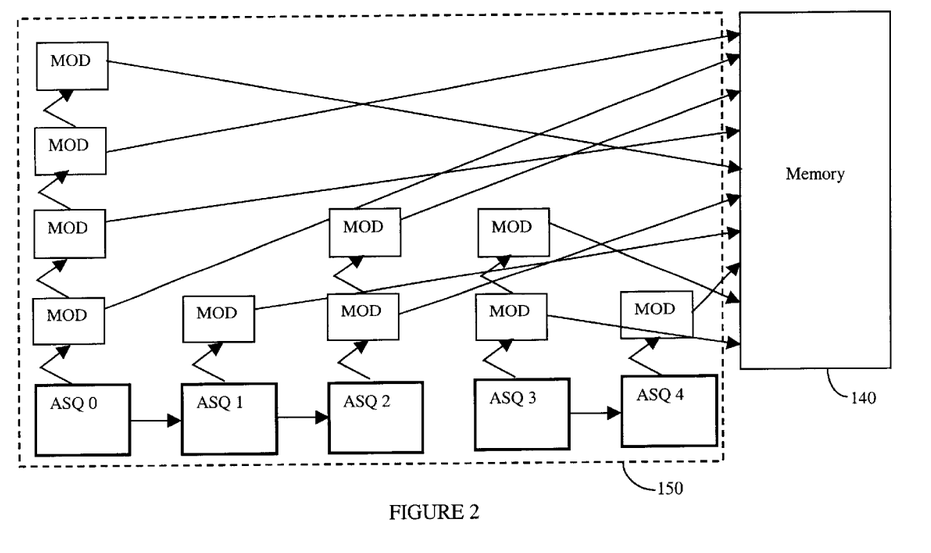
FIG. 2 illustrates a schematic block diagram describing the functionality of the queues, according to the exemplary, non-limiting embodiment of the present invention.

FIG. 2 illustrates an exemplary, non-limiting functional diagram of the operation of queues in the second memory 150. Two groups of ASQs are shown, as ASQs "0", "1" and "2" belong to a first linked ASQ group, and ASQs "3" and "4" belong to a second linked ASQ group (e.g., a linked list). Each group of linked ASQs is handled by a single PN (e.g., 120-2, as illustrated in FIGS. 3A–3E). Each ASQ may have a plurality of memory object descriptors (MOD). The MOD for each ASQ is added as the result of the object queue handling a network event and associating the network event with a corresponding ASQ.

For the ASQs that share a common processing node, sharing may be performed based on a round robin, weighted round robin, random and/or least recently handled algorithm. However, the sharing is not limited thereto, and any related art algorithm that would be understood by one of ordinary skill in the art may be used therein.

The association of the ASQs to the MODs is performed by the object queue in conjunction with its respective PN 120. Contrary to the object queue 330 (as illustrated in FIG. 3 and described in greater detail below), which can be commonly used for more than one network connection, each ASQ corresponds to one network connection. However, the ASQ may correspond to more than one data packet, as described herein.

Packets are added to an ASQ within a group depending on their specific network connection, as each ASQ corresponds to a separate network connection. A MOD contains pointers, including, but not limited to, a pointer to a memory location such as a memory location where a packet header is stored, and a pointer to another MOD. If the MOD is the last MOD in the series, the next MOD pointer may be set to null. To efficiently handle packets by one of the PNs 120-1 . . . 120-n, data for a next packet to be handled is placed in local memory of one of the PNs 120-1 . . . 120-n prior to the beginning of processing by the designated PN (e.g., 120-2). It is not necessary to transfer the entire packet to the PN (e.g., 120-2), but only the packet header that contains the information necessary for performing the required function on the payload of the packet. Ensuring that the PN (e.g., 120-2) has the necessary information for handling a task, allows for a minimal switching time, and hence an overall improvement in performance.

Initially, packets are processed from the object queue by a PN (e.g., 120-1) to determine their specific ASQ relative to an open connection. For example, there may be two FTP sessions open in parallel and packets may arrive to any one of them. The processing via the object queue is intended to determine to which of the two ASQs, used for the respective FTP sessions, a packet should be associated for further processing. The object queue points to a MOD pointer. The MOD pointer points to the next MOD to be used. Upon determination of the packet context, i.e., its relation to a specific ASQ, it is further capable of re-pointing the MOD to the respective ASQ.

The PN (e.g., 120-1) handling a packet will re-point the MOD to the appropriate ASQ and link that MOD with the immediately preceding MOD, if required, for specific handling of the packet. The packet is handled by the PN (e.g., 120-2) handling a respective ASQ to perform the receive transport protocol termination.

A plurality of unused MODs are made available as a free-list in the second memory 150. RH 170 initiates the allocation of an MOD to the object queue through an appropriate link. The MOD is released back to the free list when the data associated with the MOD leaves apparatus 100 by means of a DMA engine (not illustrated) (i.e., receiving of a data packet is completed).

Figure 3A:
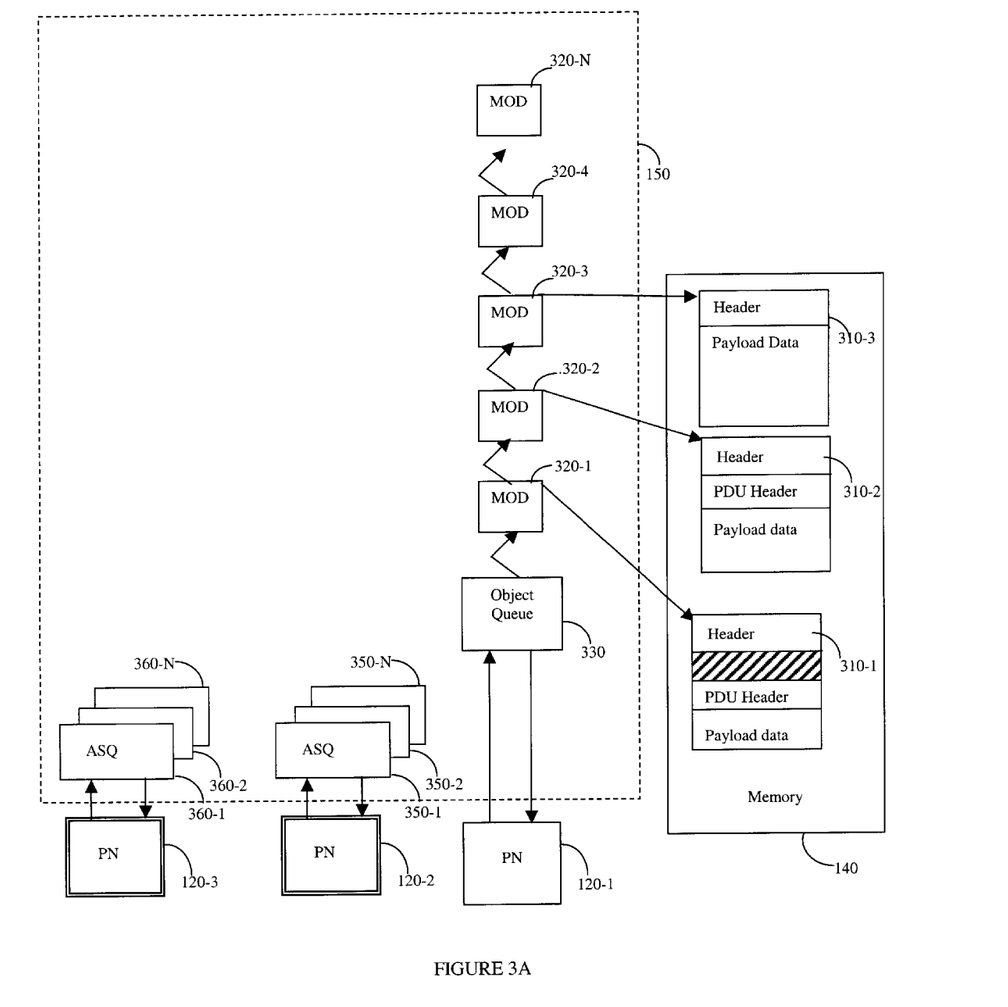
FIGS. 3A–3E illustrates reception of data over an open connection link according to the exemplary, non-limiting embodiment of the present invention.

FIGS. 3A through 3E illustrate a non-limiting example of the management of the object queue and the ASQs for preparing received data for the fifth layer of the standard communication model. FIG. 3A shows the reception of packets 310-1 . . . 310-3 by the apparatus 100. The packets 310-1 . . . 310-3 are received by the RH 170 and transferred through the communications interface 151, to be handled by QMS 110. The QMS 110 also schedules a periodic interaction between a PN (e.g., 120-2), and its respective queues. Packets 310 are saved in the first memory 140. Each packet includes a header that contains information respective of the second, third, and fourth layers (hereinafter L2, L3 and L4 respectively) of the standard communication model, as well as the payload data. Additionally, packets 310-1 and 310-2 include a protocol data unit (PDU) header that includes data relevant to the 5th layer of the standard communication model.

The PDU header does not necessarily follow the packet header immediately, and may be located at any position in the packet, as illustrated in packet 310-1. Further, a PDU and/or the payload may extend over the boundary of a packet. For example but not by way of limitation, packets 310-1 and 310-3 belong to the same packet stream (i.e., packet 310-3 is the continuation of packet 310-1), and packet 310-2 belongs to a different connection (i.e., to a stream of packets that has been opened by a different connection). It is entirely possible that a PDU may begin in packet 310-1 and continue in packet 310-3 (not illustrated), however, a packet 310-2 belonging to a different connection may come in between these two packets.

Object queue 330 is linked to multiple MODs and is under the control of QMS 110 (not shown). Typically, a single object queue 330 handles incoming packets for all network connections. The linkage of the MODs to object queue 330 is initiated by RH 170 upon receipt of a packet, and is handled by QMS 110 where a MOD to be used is selected from a free-list of MODs in second memory 150. In other words, the QMS performs queue allocation for the object queue 330, and space for the queue is allocated in the second memory 150. For each of packets 310-1 . . . 310-3, object queue 330 associates a MOD (e.g., MOD 320-1). MODs 320-1 . . . 320-N are linked to object queue 330 using a linked list format.

Each of MODs 320-1 . . . 320-N contains at least one pointer pointing to the beginning of each of the packets 310-1 . . . 310-3 placed in the first memory 140 (i.e., pointing to the packet header as well as a connection context) associating a packet with its specific network connection. In this example, three MODs 320-1 . . . 320-3 point to the beginning of three respective packets 310-1 . . . 310-3.

Once one of the MODs 320-1 . . . 320-N is released, it can be re-linked to the free MODs list for use in conjunction with newly arrived packets. At this stage, QMS 110 includes multiple inactive ASQs 350 and 360 associated with PN 120-2 and 1203, respectively. All ASQs are made available when the network connection is established, and correspond to the type of network connection that is established. While in this example three PNs 120-1 . . . 120-3 are shown, a person skilled in the art could easily be able to implement the apparatus using, for example but not by way of limitation, a single PN 120-1 having object queues and ASQs operational on the single PN 120-1. Any other number of PNs such as PN 120-1 are further possible, hence allowing for increased flexibility, scalability and redundancy of apparatus 100.

Figure 3B:
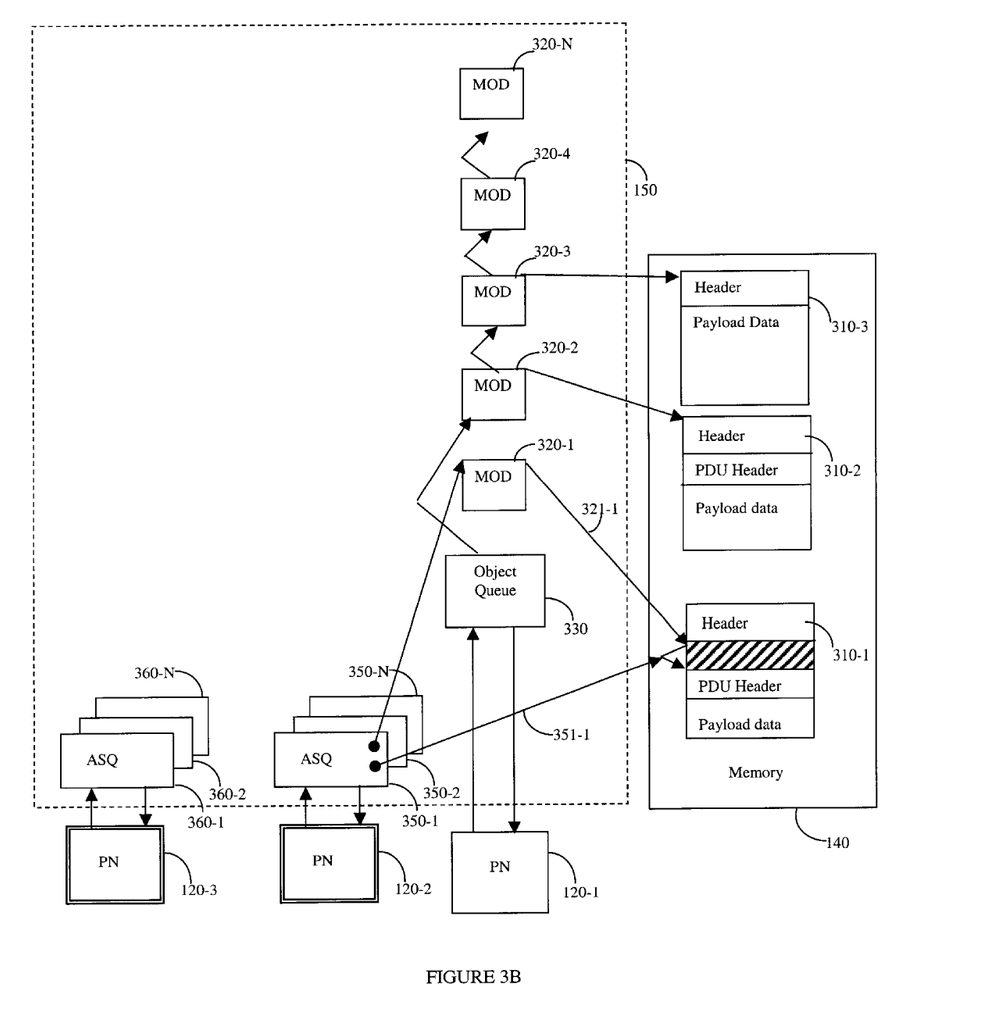

FIG. 3B illustrates the association of an ASQ 350-1 with packet 310-1. Object queue 330 sends a queue event to PN 120-1 that determines and links the MOD to a specific ASQ corresponding to the connection respective of the packet. In this exemplary, non-limiting embodiment, MOD 320-1 is linked to ASQ 350-1, which handles packet 310-1 based on the identification of packet 310-1 as the packet to be handled by that type of ASQ.

As a result, ASQ 350-1 points to MOD 320-1, and the link between MOD 320-1 and object queue 330 is removed. Accordingly, object queue 330 now points to MOD 320-2, and the pointer 321-1 of the MOD 320-1 is forwarded to a new point by skipping the headers of L2, L3 and L4. As the beginning of packet 310-1 may contain the tail-end of a previous PDU for the network connection, a delineation process of the previous PDU may take place prior to handling the new PDU of packet 310-1.

However, this delineation, and all the pointing to the packet content is thereafter performed by means of an offset pointer 351-1 pointing from ASQ 350-1. Hence, the pointer 351-1 in MOD 350-1 stay constant, while offset pointer 321-1 in ASQ 350-1 is incremented. The combination of pointer 321-1 and pointer 351-1 results in the specific location in the packet being handled. Updating of MOD pointers occurs only when the MOD link is moved from an object queue to an ASQ. Therefore, when control over a MOD is transferred from the object queue to an ASQ, the MOD pointer will no longer point to the beginning of the packet header, but rather to the appropriate location following the packet header respective of L2, L3 and L4. Once pointed to by an ASQ, all MOD pointers remain constant and pointing is performed by advancing an offset mechanism (e.g., pointer 351-1), as explained in more detail below.

Figure 3C:
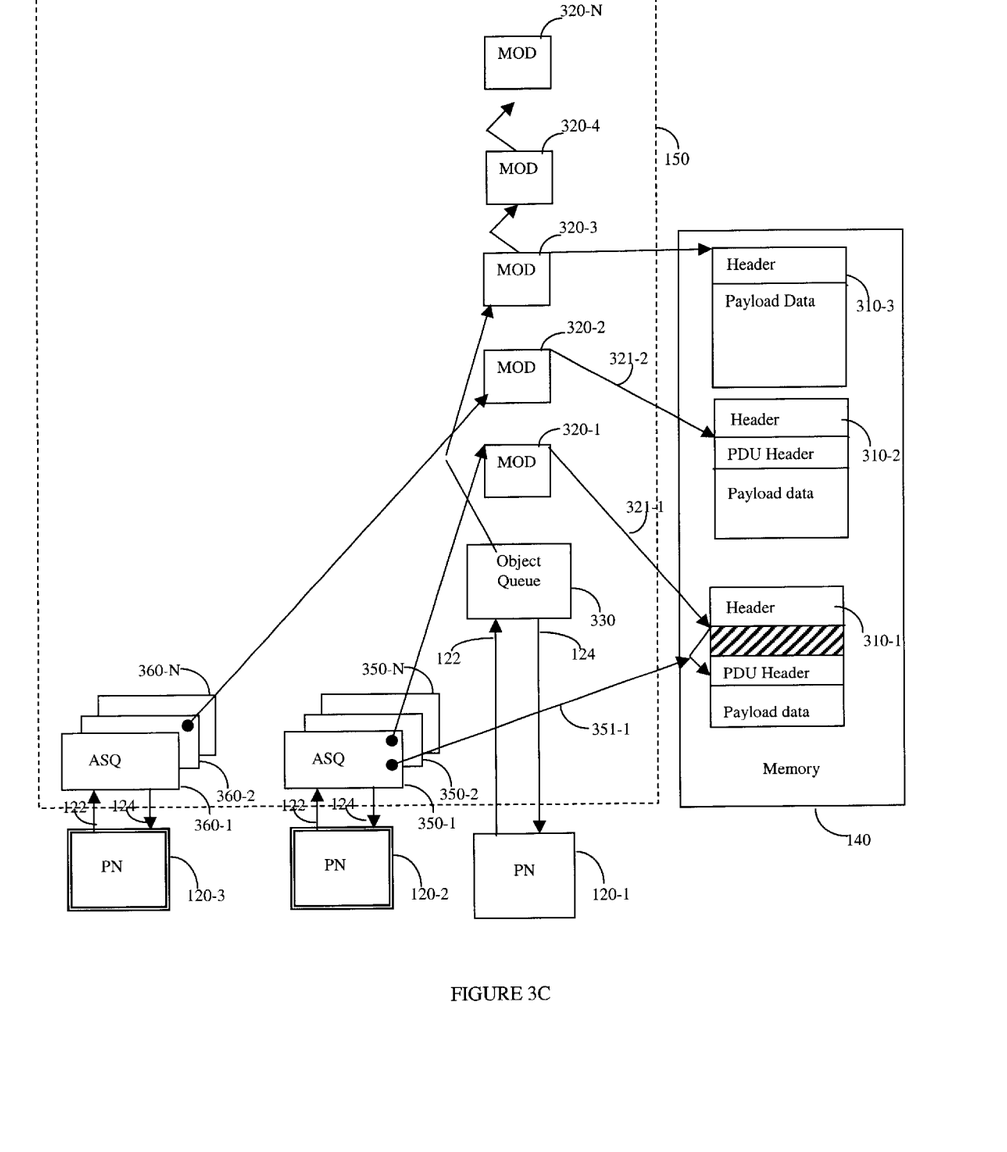

FIG. 3C illustrates the association of MOD 320-2. The pointer 321-1 from MOD 320-1 to packet 310-1, once it has been assigned to the ASQ 350-1, remains with the same value and points to the first relevant point after the packet header, as explained above. Thereafter, the pointing within the data is performed through an offset pointer 351-1 within ASQ 350-1. Further, PN 120-2 may handle ASQ 350-1 and allow the advancement of offset pointer 351-1, while PN 120-1 handling object queue 330 continues the handling of MOD 320-2, as shown in the illustration.

MOD 320-2 points to packet 310-2 that belongs to a different network connection (i.e., to an independent stream of packets). When PN 120-1 is initiated by the object queue 330 to handle MOD 320-2, PN 120-1 identifies MOD 320-2 as such, and MOD 320-2 is linked to a different ASQ. Here, MOD 320-2 is linked to ASQ 360-2, which operates in conjunction with PN 120-3. As mentioned above, it is possible to implement apparatus 100 such that all queues are handled by a single PN, or by a multiple number of PNs. Furthermore, a person skilled in the art would be able to configure such operation of multiple PNs in real-time, i.e., determine how many PNs operate, or are otherwise made available, at any given point in time. Next, the link of MOD 320-2 is removed from object queue 330, and object queue 330 is made to point to the MOD 320-3. The pointer 321-2 of MOD 320-2 is updated to point to a position immediately after the L2, L3 and L4 headers, and in this example to the PDU header of packet 310-2. The object queue 330 continues to move up the MOD list.

Figure 3D:
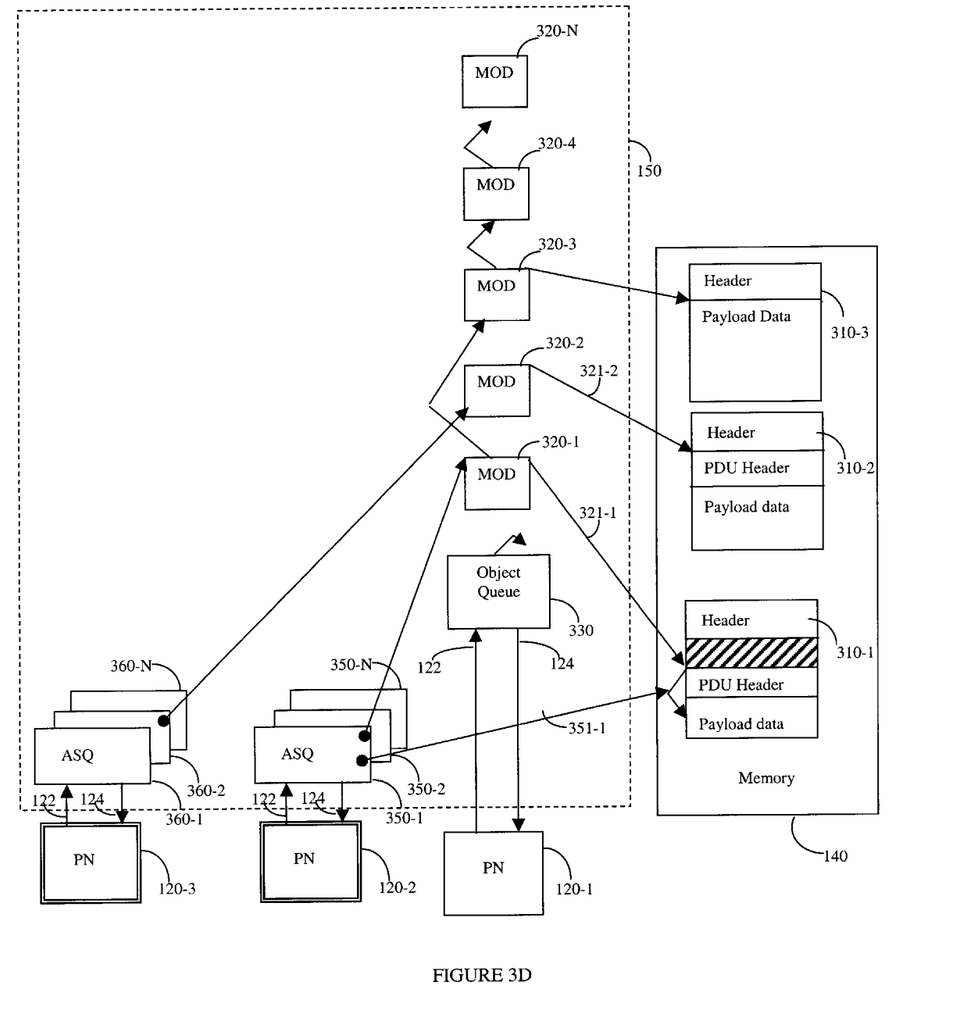

FIG. 3D illustrates the association of MOD 320-3. MOD 320-3 points to packet 310-3 that belongs to the same connection as packet 310-1. Therefore, object queue 330 links MOD 320-3 to ASQ 350-1. However, as ASQ 350-1 already includes a link to MOD 320-1, MOD 320-3 is linked to MOD 320-1. Next, the link of MOD 320-3 is removed from object queue 330 (i.e., the object queue 330 pointer is made to a null pointer) as no more packets have been received and the object queue 330 has linked all data packets with ASQs via MODs. Once the packet 310-1 has been received from the network (i.e., data packet successfully reaches its intended destination), MOD 320-1 is released to the MOD free-list (not shown) in the second memory 150, and may be used when new packets are received.

Pointing to the payload data within packet 310-3 is performed by the offset pointer 351-1 of ASQ 350-1, as explained in more detail below. While, for simplification of the explanation, the process of associating MODs 320-1 and 320-2 to their respective ASQs 350 and 360 is shown, one skilled in the art would know that the ASQ 350 and 360 may begin their operation on the packets prior to the completion of the operation of the object queue 330. It should be further noted that PN 120-2 may be processing packet 310-1 and causing the advancement of offset pointer 351-1 of ASQ 350-1.

Figure 3E:
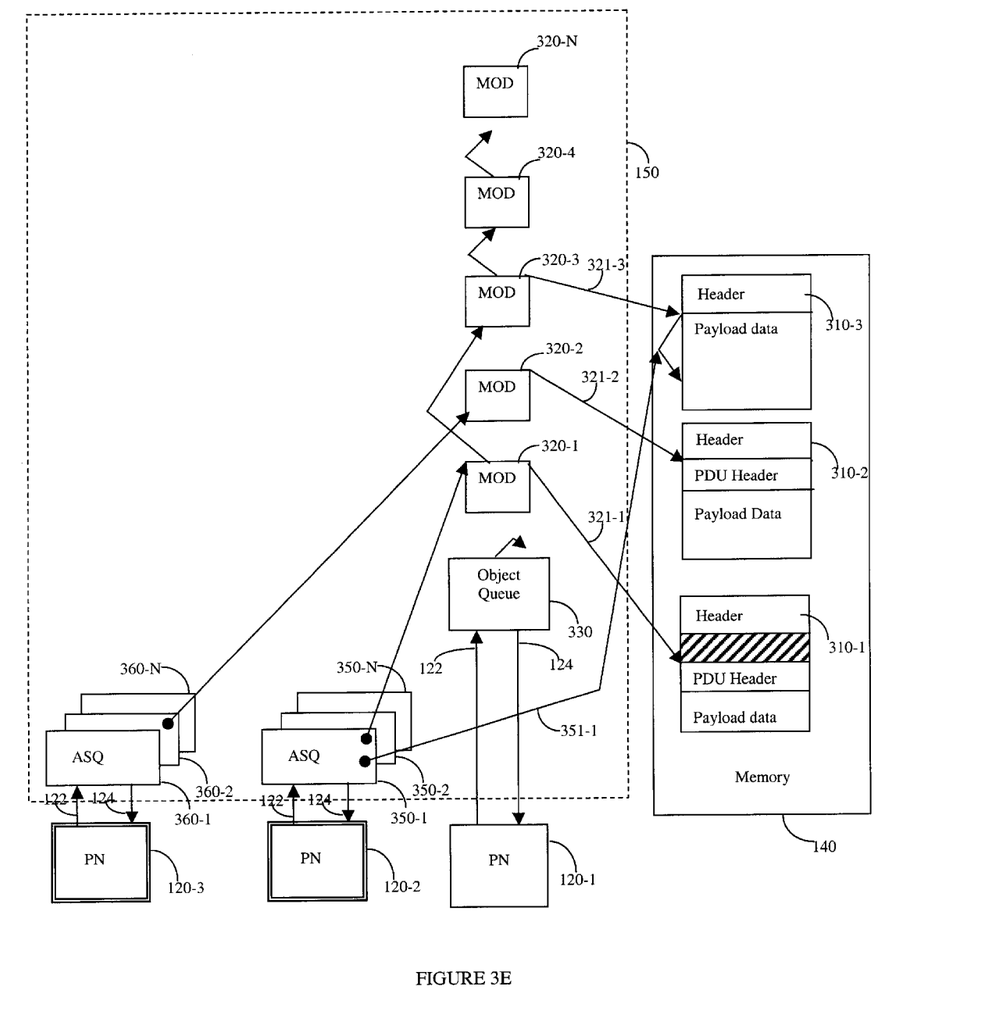

FIG. 3E further illustrates the process of receiving data from packets 310-1 and 310-3. Once the offset pointer 351-1 reaches the end of packet 310-1 ASQ 350-1 continues to operate from MOD 320-3 with offset pointer 351-1 pointing to data in combination with MOD pointer 321-3.

Referring back to FIG. 3B the process of getting data from packet 310-1 starts with a PN (e.g., 120-2) sending a Wait-for-Byte command 122 to ASQ 350-1. The Wait-for-Byte command 122 includes information requesting a number of bytes, including (but not limited to) the size of at least the PDU header. Accordingly, ASQ 350-1 responds with a work item descriptor (WID) 124, which provides information on the number of bytes actually available in first memory 140. PN 120-2, once the number of bytes available in the first memory 140 corresponds to its requested number of bytes, processes the PDU header and parses the payload data size field.

As a result of PN 120-2 processing the PDU header of packet 310-1, the offset pointer 351-1 of ASQ 350-1 is advanced so that the combination of the MOD pointer and the offset pointer result in pointing to the next to be provided data. Subsequently, PN 120-2 sends another Wait-for-Byte command 122 to ASQ 350-1, which may respond with another WID once the number of bytes requested to be transferred is actually available. The number of bytes to be transferred shall not exceed the total payload data size, which may be split over several packets. Accordingly, the PN (e.g., 120-2) determines the length of the data to be received.

PN 120-2 then initiates the process by which the DMA engine of PN 120-2 moves the requested amount of data to the desired destination. In this example, packet 310-3 payload is also required to complete the receive process. The sequence of the Wait-for-Byte command 122 and the WID 124 between PN 120-2 and ASQ 350-1 continues until the entire payload is transferred to its destination. In this process, the MOD index in the ASQ 350-1 may be forwarded to point to the next MOD to be used, as well as the offset pointer 351-1 used in conjunction with the pointer of each MOD. Similarly, the process may take place with the independent packet 310-2, which may happen simultaneously to the handling of packets 310-1 and 310-3, as ASQ 360-2 is handled by PN 120-3 independently of PN 120-2. However, the present invention is not limited thereto.

Figure 4:
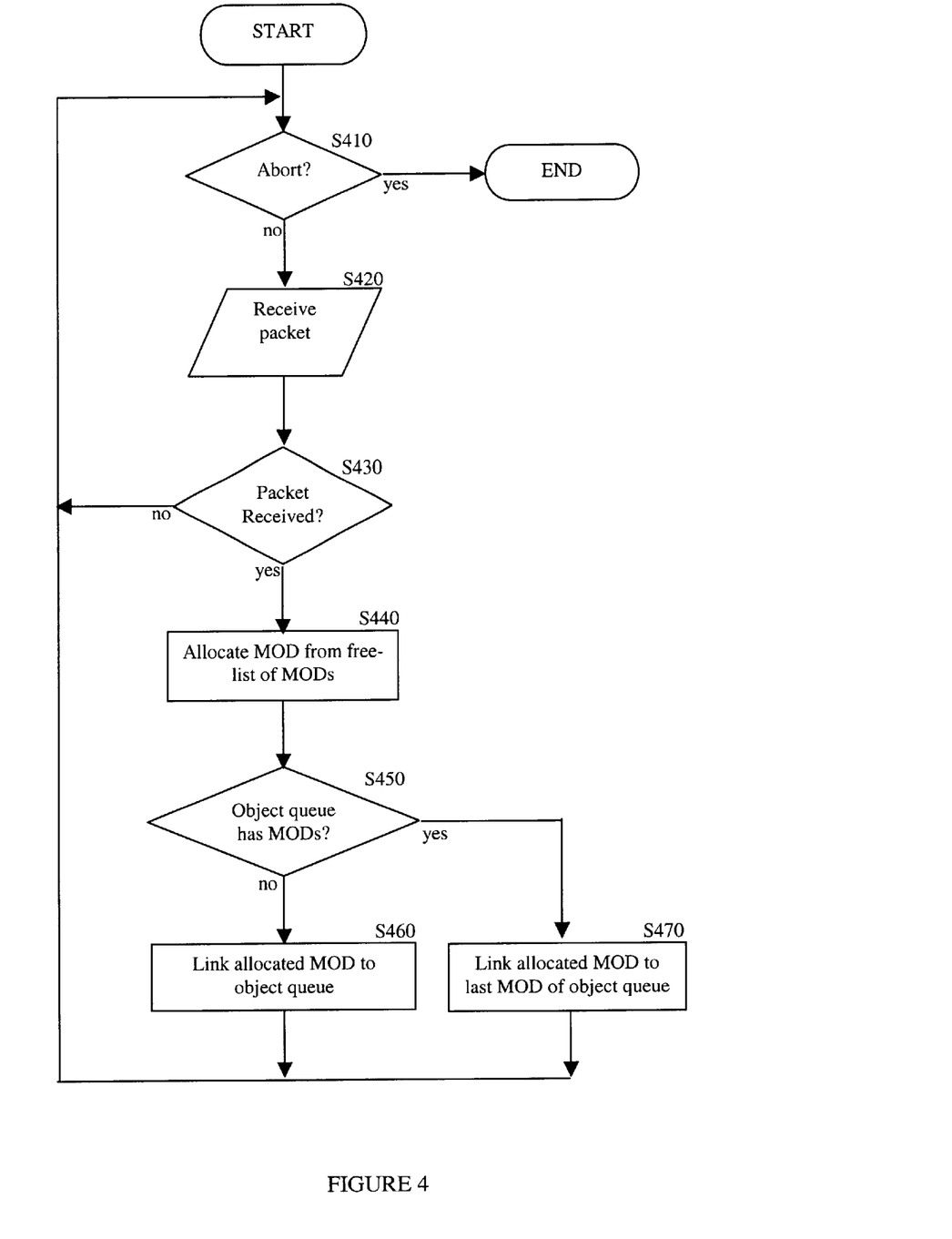
FIGS. 4–6 illustrates methods for implementing an exemplary, non-limiting embodiment of the present invention.

FIG. 4 illustrates a flowchart depicting an exemplary, non-limiting embodiment of an aspect of the packet receive by the object queue of the present invention. In step S410, it is determined whether the process is to be aborted. If so, the process ends. Otherwise, the process continues to expect to receive a data packet in step S420. If a data packet is identified as received in step S430, then processing continues with step S440. Alternatively, if a packet has not been received, the process returns to step S410.

In step S440, a first MOD of an free-list of MODs is allocated for the received packet. In step S450, it is determined whether there are already other MODs linked to the object queue. If so, execution continues with step S470. In step S470 the MOD is connected to the previous last MOD, and is linked to a header of the received data packet. However, if there are not other MODs linked to the object queue, in step S460, the MOD is connected to the object queue, and is linked to a header of the received data packet.

Figure 5:
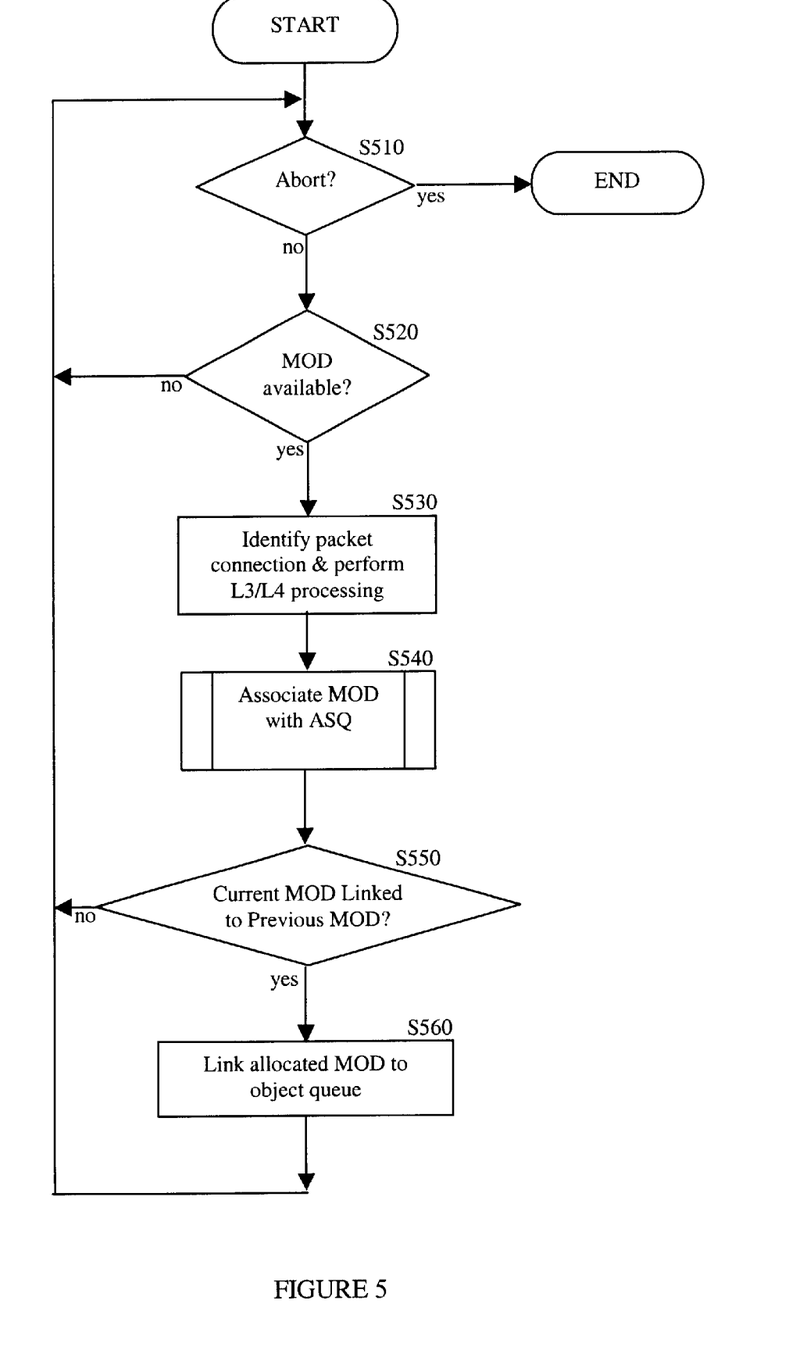

FIG. 5 illustrates a flowchart depicting an exemplary, non-limiting embodiment of an aspect of the packet association to an ASQ by the object queue of the present invention. In this method, at step S510 it is determined whether it is necessary to abort the processing, in which case the processing ends, or to continue. If the process continues, at step S520 it is checked whether a MOD is linked to the object queue. If not, then execution continues at step S510 or otherwise execution continues at step S530.

In step S530, the packet is identified as well as L3 and L4 processing taking place. In this step it is determined to which connection and application the packet belongs, and therefore, to which ASQ that packet is to be associated. In step S540, the MOD, and therefore the received packet, is associated with an ASQ. To perform this process in step S540, the object queue pointer to MOD is replaced by a pointer from the ASQ, if there are no other MODs pointed to by that ASQ, or otherwise, by a link from the current last MOD linked to the ASQ.

The MOD pointer to the data packet is updated from the header of the first data packet to point to the PDU header of the data packet, or otherwise to the start of the payload data. In step S550, it is determined whether the MOD now associated with the ASQ was linked to another MOD. If it was not, i.e., there was only a single MOD linked to the object queue, then processing continues with step S510. However, if it is determined that there was another MOD linked to the MOD now associated with its respective ASQ, then at step S560, the MOD linked by the now associated MOD is linked to the object queue, and will be the next MOD to be processed as processing continues.

Figure 6:
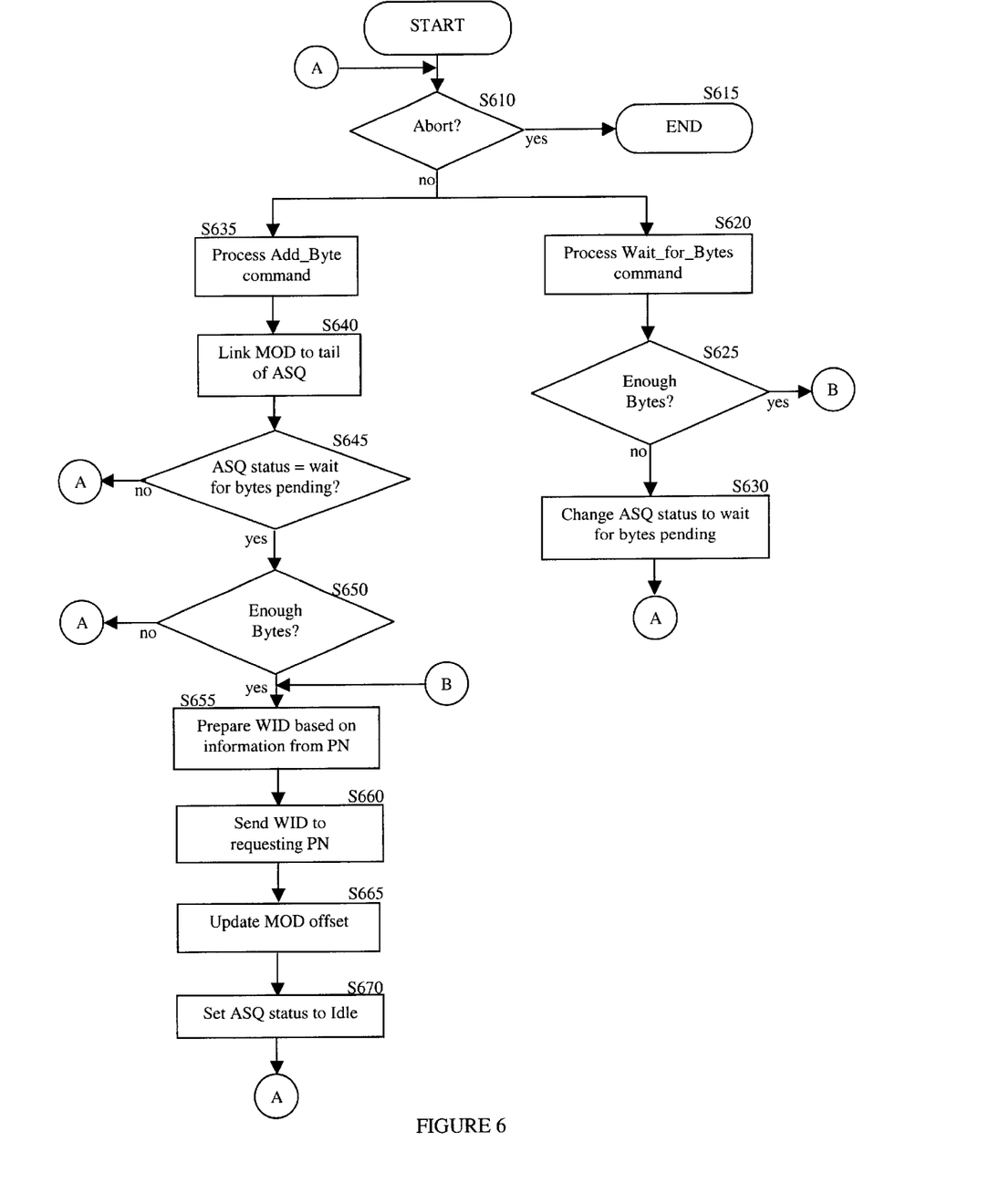

FIG. 6 illustrates a flowchart depicting an exemplary, non-limiting embodiment of an aspect of the handling of a packet by an ASQ of the present invention. In this method, at step S610, it is determined whether the process should be aborted. If so, the process is terminated in step S615; otherwise, one of two possible routes may be taken, depending on the type of command to be processed. In step S620, a "wait for byte" command, sent from a PN to the ASQ, is processed. In step S625 it is determined if there is a sufficient amount of bytes to continue processing. If the number of bytes is sufficient execution continues with step S655, explained in detail below. If there are not enough bytes, execution continues with step S630. At step S630, the ASQ status is changed to "wait for bytes pending", indicating that the ASQ is waiting to receive additional bytes before it can proceed with the processing of the event, and processing returns to step-S610.

The alternate route results from an "Add_Byte" command which is processed in step S625. This command is issued when there are bytes that are to be added to the ASQ for its processing requirements. In step S640 the MOD respective of the additional bytes received is linked to the tail of the ASQ, i.e., the new MOD is linked to the currently last MOD linked to the ASQ.

In step S645 the status of the ASQ is checked and if it is in the "wait for bytes pending" mode execution continues with step S610; otherwise, execution continues with step S650. In step S650 it is checked if there are enough bytes to continue processing and if there are not, execution continues with step S610; otherwise execution continues with step S655.

In step S655 the WID is prepared and in step S660, the WID is sent to the PN for execution, i.e., to perform the specific data transfer from the data to the required destination. At step S665, the MOD offset in the ASQ is updated, and in step S670 the ASQ status is set back to idle. Execution will continue with step S610.

Additionally, the methods illustrated in FIGS. 4, 5 and 6 may be sequentially or simultaneously applied to a second MOD that points to a second data packet, and a second ASQ that controls processing of the data in the second data packet.

The present invention has various advantages. For example, but not by way of limitation, the present invention overcomes the problems and disadvantages of the related art. Additionally, the present invention results in a minimum switching time for handling a given task in the transmit transport termination process.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An apparatus for handling receive transport protocol termination of network events of a source to a destination connection, comprising:
    a processing node (PN);
    a queue manager and scheduler (QMS) coupled between said PN and a first memory that includes at least one queue that is controlled by said processing node;
    a data manager coupled between said PN and a second memory that is configured to store data packets of said network events; and a receive handler capable of receiving said data packets from a network, wherein said QMS, said data manager and said receive handler are capable of commonly communicating with one another.

2. The apparatus of claim 1, wherein said processing node comprises at least one of a local memory, a code memory, a direct memory access controller (DMAC) and a processor core.

3. The apparatus of claim 2, wherein a code for said code memory is downloadable to at least one of hardware and software.

4. The apparatus of claim 2, wherein said code memory comprises at least code for processing said network events.

5. The apparatus of claim 2, wherein said DMAC receives data from at least one of said second memory, said local memory and a host memory.

6. The apparatus of claim 5, wherein said receiving of data is performed in parallel with performing another task at said processing node.

7. The apparatus of claim 2, wherein said DMAC transmits data to at least one of said second memory, said local memory and a host memory.

8. The apparatus of claim 7, wherein said transmission is performed in parallel with said processing node performing another task.

9. The apparatus of claim 1, wherein one of said network events is one of a new packet arrival from the network, a request from host, and a protocol time-out.

10. The apparatus of claim 1, wherein said first memory is implemented using a static random access memory (SRAM) unit.

11. The apparatus of claim 1, wherein said QMS allocates queues for handling said data packets.

12. The apparatus of claim 11, wherein space for said queue is allocated in said first memory.

13. The apparatus of claim 11, wherein said allocated queues are at least an object queue and an application stream queue (ASQ).

14. The apparatus of claim 13, wherein said object queue is commonly opened for all network connections.

15. The apparatus of claim 13, wherein said ASQ is opened for a specific corresponding network connection.

16. The apparatus of claim 11, wherein one of said allocated queues points to at least another one of said allocated queues.

17. The apparatus of claim 16, wherein one of said allocated queues is linked to said another one of said allocated queues as a linked list.

18. The apparatus of claim 16, wherein said allocated queue and said another queue alternately share a common processing node.

19. The apparatus of claim 18, wherein said alternately sharing of the common processing node is performed by means of at least one of: round robin, weighted round robin, random and least recently handled.

20. The apparatus of claim 13, wherein a memory object descriptor (MOD), pointed to by one of object queue, ASQ, or another MOD is configured to point to one of said data packets located in said second memory.

21. The apparatus of claim 20, wherein space for said MOD is allocated on said first memory.

22. The apparatus of claim 20, wherein a plurality of said MODs are available from a free-list in said first memory.

23. The apparatus of claim 20, wherein said object queue initiates processing of a received packet pointed to by said MOD.

24. The apparatus of claim 20, wherein said processing node sends said ASQ a Add-Bytes command that includes at least a value corresponding to a number of bytes to be added.

25. The apparatus of claim 24, wherein in response to an Add_Byte command, a MOD from said object queue is linked to said ASQ.

26. The apparatus of claim 25, wherein if an ASQ status is "wait for bytes pending",
a) if a number of said bytes exceeds and prescribed number, preparing a WID based on PDU header information; else,
b) checking for next available data.

27. The apparatus of claim 26, wherein a WID is sent to the requesting processing node.

28. The apparatus of claim 27, wherein a MOD offset pointer is updated.

29. The apparatus of claim 28, wherein said ASQ status is set to "idle".

30. The apparatus of claim 24, wherein said ASQ sends to said processing node a Wait-for-Bytes command.

31. The apparatus of claim 30, wherein said processing node checks for a sufficient number of bytes in response to said Wait-for-Bytes command.

32. The apparatus of claim 31, wherein said processing node prepares said WID if a prescribed number of bytes is available in said second memory.

33. The apparatus of claim 32, wherein said processing node changes the status of said ASQ to "wait for bytes pending" if said prescribed number of bytes is not present in said second memory.

34. The apparatus of claim 28, wherein said processing node, upon receiving all said data to be received, initializes a direct memory access (DMA) associated with said processing node.

35. The apparatus of claim 34, wherein said DMA transfers said data to be received from said second memory to a designated destination.

36. The apparatus of claim 33, wherein said processing node is capable of releasing said MOD upon completion of the handling of its associated packet stored in said second memory.

37. The apparatus of claim 11, wherein said queue contains at least one of a memory object descriptor (MOD) identification pointer and an offset pointer.

38. The apparatus of claim 37, wherein said MOD identification pointer points to a next to be used MOD.

39. The apparatus of claim 37, wherein said offset pointer is used as an offset value from a pointer in an MOD pointed to by said MOD identification pointer.

40. A queue managing and scheduling system (QMS) for handling receive transport protocol termination of network events of a source to destination connection, comprising:
an interface to a receive handler capable of providing a next available memory object descriptor (MOD) with pointer information of a packet located in a second memory, and wherein said QMS is capable of receiving a command from said receive handler and initiating packet handling by an object queue located in a first memory.

41. The QMS of claim 40, wherein said MOD is linked to an object queue and contains at least one pointer to a received packet located in said second memory, wherein said at least one pointer initially points to a header of said received packet.

42. The QMS of claim 41, wherein said QMS updates said at least one pointer in said MOD to point to data immediately following a header of said received packet.

43. The QMS of claim 40, wherein said QMS is further connected to at least one processing node that controls said object queue.

44. The QMS of claim 40, wherein said QMS is configured for allocating said object queue and an application stream queue (ASQ) in said first memory.

45. The QMS of claim 44, wherein said QMS commonly allocates said object queue for all network connections, and separately allocates each said ASQ for corresponding ones of said network connections.

46. The QMS of claim 43, wherein said QMS allocates said object queue to said at least one processing node.

47. The QMS of claim 43, wherein said QMS allocates said ASQ to said at least one processing node.

48. The QMS of claim 40, wherein said memory object descriptor (MOD) is pointed to by one of object queue and ASQ.

49. The QMS of claim 48, wherein said MOD points to at least another MOD.

50. The QMS of claim 43, wherein said QMS schedules periodic interaction between said at least one processing node and one of said object queue and said ASQ.

51. The QMS of claim 50, wherein said periodic interaction is determined by at least one of round robin, weighted round robin, random and least recently handled methods.

52. A method for handling a receive transport protocol termination of network events respective of a source to destination connection, having at least two queues, comprising the steps of:
   a) allocating at least one object queue for handling reception of at least one packet received from a network;
   b) allocating at least one application stream queue (ASQ) for handling packets after connection identification;
   c) receiving a data packet and positioning a pointer from said at least one object queue to said received data packet;
   d) identifying said received data packet, and transferring handling of said identified data packet to said ASQ; and
   e) pre-fetching control information for said data packet to a processing node allocated to handle said second queue, wherein said handling of said identified packet is controlled by said processing node, and said data packet is received in a second memory.

53. The method of claim 52, wherein said object queue and said ASQ are allocated in a first memory.

54. The method of claim 52, wherein said queue points to at least another queue.

55. The method of claim 54, wherein one of said at least two queues is linked to another one of said at least two queues in a linked list.

56. The method of claim 54, wherein said queue and said another queue alternately share a common processing node.

57. The method of claim 56, wherein said alternately sharing a common processing node is performed by at least one of round robin, weighted round robin, random and least recently handled methods.

58. The method of claim 52, wherein said object queue further points to a memory object descriptor (MOD).

59. The method of claim 58, wherein said MOD points to at least one of another MOD and the header of said received packet.

60. The method of claim 59, wherein a first processing node is allocated to handle said object queue.

61. The method of claim 60, further comprising associating said received packet with said ASQ, wherein said processing node determines at least the type of packet received, its respective network connection and the application stream queue (ASQ) to which it should be associated.

62. The method of claim 61, further comprising the steps of:
   handling said second queue associated with said received data packets until all of said data has been received; and
   initializing a direct memory access (DMA) engine associated with said processing node in order to transfer the received data to the destination.

63. The method of claim 62, further comprising the step of:
   releasing said MOD upon completion of the transfer of said data, and placing said MOD in a free list of MODs.

64. The method of claim 61, wherein said association comprises:
   a) processing an Add_Byte command;
   b) linking a MOD to a tail of an ASQ;
   c) if a status of said ASQ is "wait for bytes pending" and there are a prescribed number of bytes for PDU processing, preparing a WID based on information provided by said processing node, else, continue with other processing;
   d) responding with a WID to said requesting processing node;
   e) updating a MOD offset pointer; and
   f) setting said status of said ASQ to "idle".

65. The method of claim 63, further comprising:
   a) processing a Wait_for_Bytes command;
   b) if there are a prescribed number of bytes, preparing a WID based on information provided by said processing node, else, performing the steps of:
      b1) set ASQ status to "wait for bytes pending"; and,
      b2) continue with other processing;
   c) responding with a WID to requesting processing node;
   d) updating MOD offset pointer; and,
   e) setting an ASQ status to "idle".

* * * * *